C. W. BOPP.
CLUTCH LEVER LOCK DEVICE.
APPLICATION FILED JULY 6, 1918.
1,333,535.
Patented Mar. 9, 1920.
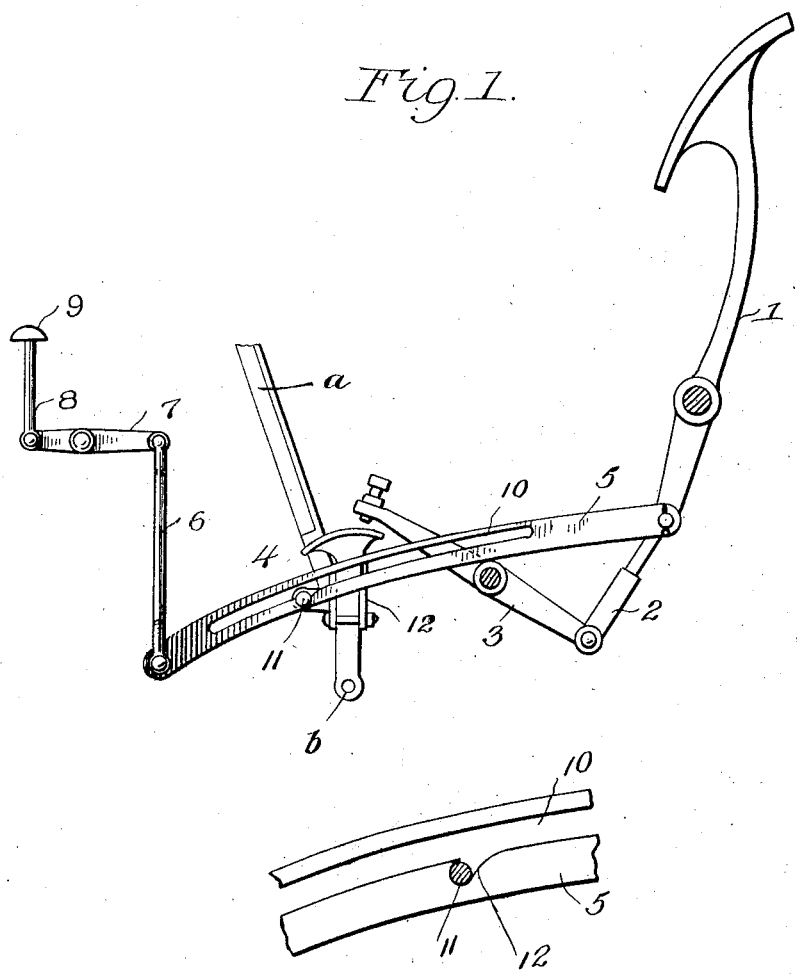
Inventor
Charles W. Bopp.
By Victor J. Evans
Attorney

UNITED STATES PATENT OFFICE.

CHARLES WILLIAM BOPP, OF LEECHBURG, PENNSYLVANIA.

CLUTCH-LEVER-LOCK DEVICE.

1,333,535.   Specification of Letters Patent.   Patented Mar. 9, 1920.

Application filed July 6, 1918. Serial No. 243,548.

*To all whom it may concern:*

Be it known that I, CHARLES W. BOPP, a citizen of the United States, residing at Leechburg, in the county of Armstrong and State of Pennsylvania, have invented new and useful Improvements in Clutch-Lever-Lock Devices, of which the following is a specification.

This invention relates to an apparatus for mechanically locking a clutch pedal in a low speed position and has for its primary object to provide a device of simple construction that may be readily operated at the will of the driver.

An object of the invention is to provide means to lock the clutch pedal to the brake shaft cam without materially affecting the operation of the cam under normal conditions.

With these and other objects in view the invention will be better understood from the following detailed description taken in connection with the accompanying drawing wherein:

Figure 1 is a detailed view of a portion of the clutch pedal and associated parts of a "Ford" car showing my invention applied thereto and in operative position.

Fig. 2 is a detailed enlarged view showing the pin engaging the notch in the link.

At the start I wish to call attention to the fact that although the invention is shown associated with the well known "Ford" clutch pedal and cam, I wish it to be understood that the same may be changed to accommodate other cars without affecting the invention as hereinafter claimed.

Again referring to the drawing the numeral 1 designates the clutch pedal of the "Ford" type shown connected by a connector 2 to the clutch lever 3. This clutch lever 3 coöperates with a cam 4 secured on the brake shaft, in the known manner. Pivotally connected to the connector 2, where it is attached to the pedal 1, is a link 5 also pivotally connected to a rod 6 that is in turn connected to a lever 7 of a foot pedal 8. The head 9 of the foot pedal projects through the floor of the car in a position to be readily operated by the foot of the driver. The link 5 is provided with a slot 10 for accomplishing a sliding action between the link and a pin 11 that projects from a bracket 12 clamped to the cam 4.

As far as I have proceeded it will be seen that normally gravitational force causes the link 5 to rest upon the pin 11 and thereby allowing sliding action of the link. For the purpose of locking the link to the cam, thereby locking the clutch pedal to the cam, I provide in the lower wall of the slot 10 a notch 12 inclining upwardly in a direction toward the clutch pedal 1 so that when the pin is disposed therein the link, it will be locked to the cam when the cam is forced to the left, as considered in Fig. 1 of the drawings. By throwing the cam 4 back to forward neutral position the pin 11 is released from the walls of the notch 12 thereby allowing the link to gravitate to a position to allow free movement of the pin 11 through the slot 10.

In Fig. 1 of the drawings, the clutch pedal 1 is shown in low speed position, cam 4 being also in low speed position and brake lever "a" in back neutral position. When the brake lever is moved into back neutral position and the link 5 is raised by depressing pedal 8, the cam 4 which is secured on the brake lever shaft "b" is moved rearwardly so as to bring the pin 11 into engagement with notch 12, this pin being maintained in locking position by the pressure exerted on link 5 by pedal 1 thus holding the pedal in low speed position. This serves to hold the clutch pedal in low speed position, but the pedal may be readily released by very slight forward movement of the brake lever thus releasing the pin from the link 5 which drops by gravity so as to be freely slidable upon pin 11 in either direction. When the link 5 is thus dropped, as it normally is, the clutch pedal may be moved into any desired position independently of movement of the brake lever, and the brake lever may also be shifted as desired independently of the clutch pedal, and there is no possibility of interference between the operation of the clutch pedal and the brake lever under ordinary conditions. When the device is in locking or operative position, as illustrated in Fig. 1, the brake may be readily applied by very slight movement of the brake lever forwardly into central neutral position thus permitting the link 5 to drop, after which the brake lever may be moved back into full brake applied position. It is to be noted that, when the link 5 is thus released, and the brakes applied, the clutch pedal 1 is at all times held in low speed position by the cam 4 and there is no possibility of movement of this pedal into high speed position. I deem it an important feature of my invention that under normal conditions, when the link is lowered, the operator has absolute freedom of movement of either the clutch pedal or the brake lever and there is no possibility of these two members becoming locked together, regardless of their relative positions.

Having described my invention, what I claim is:

1. In combination with transmission mechanism including a brake lever shaft, a brake lever secured thereon, a cam secured on said shaft, and a clutch pedal; a link pivoted to the lower end of said pedal, coöperating means carried by said link and the cam for locking the two together when the link is raised and the pedal is in low speed position with the brake lever in neutral position, said link being normally held in lowered position, and means independent of said brake lever for raising the link into operative position.

2. In combination with a clutch pedal and a cam associated therewith, a link pivoted to the lower end of said pedal, coöperating means carried by said link and the cam for locking the two together only when the link is raised and the pedal is in low speed position, said link being normally in lowered position, and means for raising the link independently of adjustment of said cam.

3. In combination a clutch pedal, a foot pedal, a cam having a pin projecting therefrom, a link connected to the clutch pedal and provided with a slot slidably receiving said pin and a notch in its lower wall for the reception of said pin for locking the link to said pin, said link being normally in lowered position and slidable on said pin, and connections between the link and said foot pedal for raising the link into operative position so as to optionally cause engagement of the pin into said notch upon movement of the cam into low speed position.

In testimony whereof I affix my signature.

CHARLES WILLIAM BOPP.